(12) United States Patent
Cox et al.

(10) Patent No.: US 12,527,330 B2
(45) Date of Patent: Jan. 20, 2026

(54) APPARATUS AND METHOD FOR PRODUCING SCORED DOUGH PIECES

(71) Applicant: General Mills, Inc., Minneapolis, MN (US)

(72) Inventors: Steven J. Cox, Long Lake, MN (US); David J. Domingues, Plymouth, MN (US); Roger G. Fuentes, St. Louis Park, MN (US); Paul Henderson, Lakeville, MN (US); Kara M. Hobart, New Hope, MN (US); Olivia Murch, Minneapolis, MN (US); Vani Vemulapalli, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 890 days.

(21) Appl. No.: 17/343,950

(22) Filed: Jun. 10, 2021

(65) Prior Publication Data
US 2022/0394982 A1 Dec. 15, 2022

(51) Int. Cl.
*A21D 8/06* (2006.01)
*A21C 11/12* (2006.01)
*A21D 6/00* (2006.01)

(52) U.S. Cl.
CPC ............ *A21C 11/12* (2013.01); *A21D 6/001* (2013.01); *A21D 8/06* (2013.01)

(58) Field of Classification Search
None
See application file for complete search history.

(56) References Cited

U.S. PATENT DOCUMENTS

| | | | | |
|---|---|---|---|---|
| 5,935,629 | A * | 8/1999 | Martin | B26D 3/08 |
| | | | | 99/485 |
| 2006/0024416 | A1* | 2/2006 | Casper | A21D 13/20 |
| | | | | 426/549 |
| 2007/0014891 | A1* | 1/2007 | Gale | A21D 8/042 |
| | | | | 426/20 |
| 2010/0166911 | A1* | 7/2010 | Upreti | A21D 6/00 |
| | | | | 426/19 |
| 2012/0045544 | A1* | 2/2012 | Xie | A21D 8/047 |
| | | | | 426/62 |

* cited by examiner

*Primary Examiner* — Lien T Tran
(74) *Attorney, Agent, or Firm* — Jordan IP Law, LLC; Tina Yin Sowatzke, Esq.

(57) ABSTRACT

A bread product is produced by forming a dough piece, creating at least one score in the dough piece, applying an adhesive to the dough piece with the adhesive extending across the score, freezing the dough piece to produce a frozen dough piece, and baking the dough piece, causing the adhesive to melt while establishing a bread product having, in a central region of the bread product, what was once a score held together by the adhesive during the early stages of baking, an internal exposed region. The outlined production steps can be re-arranged, so long as the scoring and adhesive application is performed prior to thawing of the dough piece.

25 Claims, 3 Drawing Sheets

APPARATUS AND METHOD FOR PRODUCING SCORED DOUGH PIECES

BACKGROUND OF THE INVENTION

The present invention pertains to the art of food production and, more particularly, to the automated production of bread products.

Bakery operators sometimes purchase partially finished food products that are then finished in the bakery before being sold to consumers. For example, bakery operators can purchase frozen bread dough, which they thaw, proof and bake prior to sale. Depending on the desired bread product, the bread dough may be manually scored after proofing and before baking to help control expansion during baking and to give the resulting bread product its traditional look. Generally, it is preferred that the amount of time and labor required to finish such partially finished food products is kept to a minimum. Accordingly, it is desirable to provide bread dough that is scored before purchase by bakery operators. However, if scoring is done before proofing, the changes the dough undergoes during proofing makes it more difficult to utilize pre-proof scoring, particularly for a commercial dough producing operation.

SUMMARY OF THE INVENTION

The present invention successfully achieves the goal of scoring bread dough before purchase by bakery operators by scoring dough pieces, followed by applying an edible adhesive to the pieces over a scoring region either prior to or post freezing of the dough pieces. During subsequent thawing and proofing steps, the adhesive would initially function to maintain the integrity and cut nature of the scoring region, while the adhesive would melt during cooking, enabling the dough to expand into the score(s) and adopt a desired, substantially uniform scored appearance. Overall, regardless of when the dough is actually proofed, i.e., only partially or fully proofed before freezing, the application of the adhesive has been found to enhance the ability to produce more consistently scored, final bread products.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION OF THE INVENTION

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

As discussed above, it would be desirable to provide frozen bread dough that is scored before purchase by bakery operators or the like. However, attempts to score bread dough during initial production have shown that it is difficult to make a cut in the dough that stays intact through freezing, thawing and certainly baking. The present invention successfully achieves this goal by, following scoring of the dough pieces, applying an adhesive in a score region either prior to or post freezing of the dough pieces. During subsequent preparation and baking of the dough pieces, it has been found that the scores tend to remain intact, with the adhesive stabilizing the score and enabling the dough to expand upon proofing while the score remains intact until the adhesive melts, whereupon the dough can also expand along the score mark(s). Overall, the resulting commercially produced bread product is provided a desired, traditionally produced look.

Figure 1:
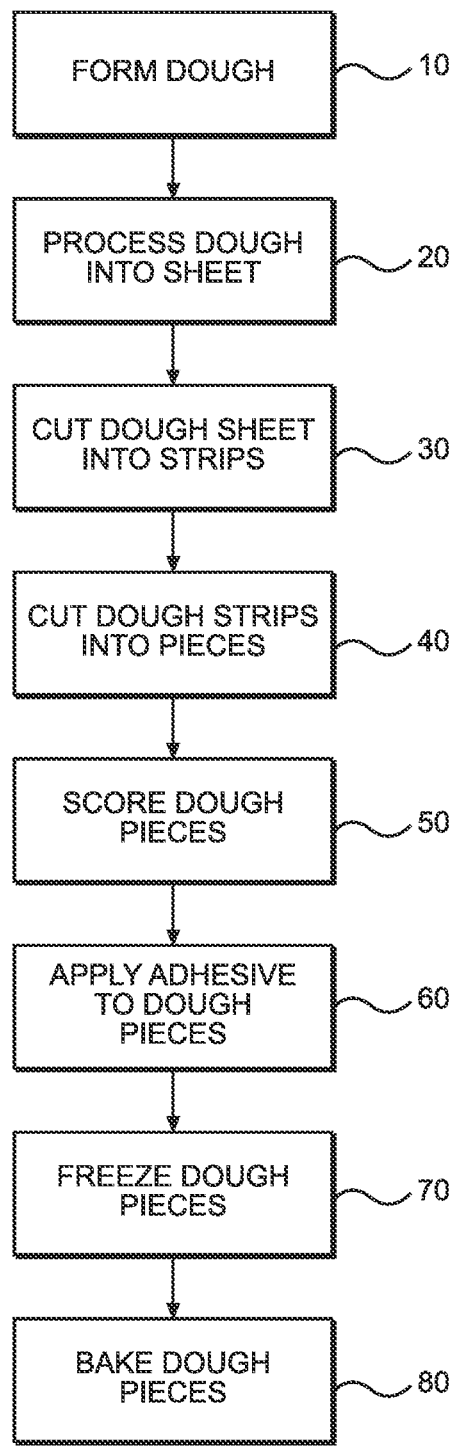
FIG. 1 is a flowchart illustrating a process for producing dough pieces in accordance with the present invention.

With reference to FIG. 1, a flowchart of a process for producing dough pieces in accordance with one embodiment of the present invention is shown. At step 10, a dough is commercially formed (such as in a batch maker or the like) and, at step 20, the dough is processed into a dough sheet. The dough sheet is then cut into dough strips at step 30, and the dough strips are cut crosswise into dough pieces at step 40. At this point, the dough pieces may be allowed to partially proof. In any case, at step 50, the dough pieces are scored. After scoring, an adhesive or glue is applied over a score region of the dough pieces at 60. The adhesive can take various forms, i.e., various edible syrups or gels, as further detailed below. In one preferred embodiment, corn syrup is employed. After the application of the adhesive, the dough pieces are frozen at step 70. At this point, the dough pieces are packaged and transported to end users who cook the dough pieces as represented at 80.

In an alternate embodiment to the process shown in FIG. 1, the adhesive may be applied after freezing the scored dough piece. In another alternative embodiment, scoring and application of the adhesive may both occur after freezing. Broadly, both the scoring and the adhesive application can occur any time before thawing of the dough piece. However, for exemplary descriptive purposes, much of the discussion below will further detail the particular embodiment wherein the adhesive is applied prior to freezing of the dough pieces.

Figure 2:
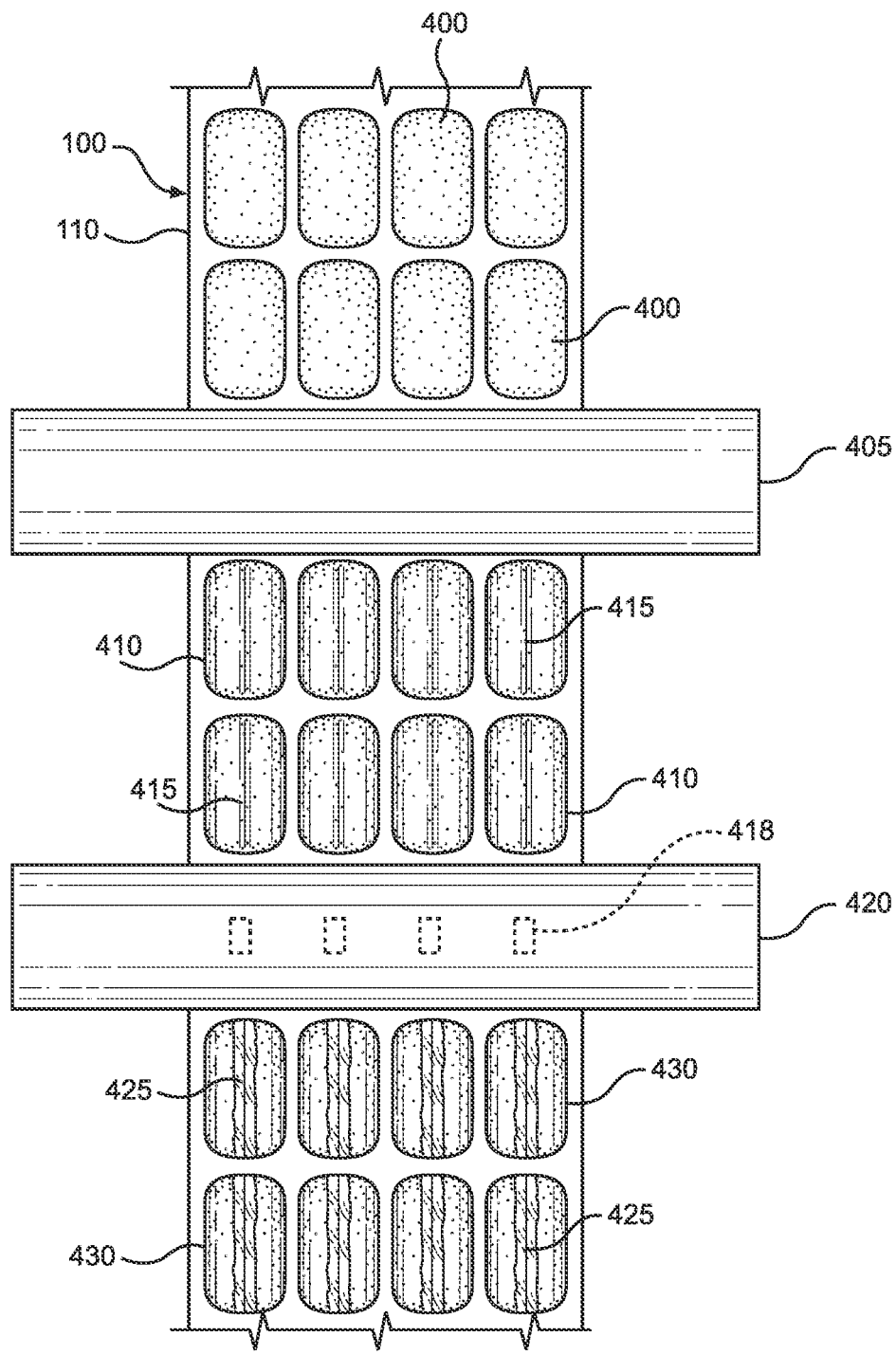
FIG. 2 is a top view of a portion of a production line for producing dough pieces in accordance with the present invention.

Turning to FIG. 2, a portion of a production line for producing dough pieces in accordance with the present invention is shown. Specifically, FIG. 2 shows a conveyor system 100 including a conveyor belt 110 for supporting and transporting dough pieces 400 which were cut from a dough sheet (not shown) at step 30 by known cutting operations such as known blunt-edge cutting operations as described, for example, in U.S. Pat. No. 6,902,754 which is incorporated herein by reference. Certainly, other conveyor and/or cutting systems known in the art can be used with the present invention including, without limitation, divider/rounder systems and stamping systems. In any case, in order to score the dough pieces 400 for step 50, dough pieces 400 proceed under a scoring unit indicated at 405 in order to produce scored dough pieces 410 have scores 415.

After scoring, in accordance with a preferred embodiment of the invention, an adhesive is applied in a scoring region of each scored dough piece. By way of example, the scored dough pieces 410 are shown to proceed under an applicator device 420 having a series of applicator heads, one of which is indicated at 418. Each applicator head 418 is shown aligned with a central longitudinal score region of a respective dough row. With continued operation of conveyor 110, the scored dough pieces 410 proceed under applicator device 420, at which time an adhesive 425 is dispensed, such as through spraying, from each applicator head 418 across the scored regions of the dough pieces 410, resulting in scored and glued dough pieces 430 (step 60). In an alternative embodiment (not shown), the dough is scored and adhesive is applied as a single step, such as by using a water cutter container a suitable concentration of adhesive.

As indicated above, the adhesive can take various consumption acceptable forms, particularly forms having a higher viscosity at room temperature and significantly lower viscosity at baking temperatures. For example, the adhesive may have a viscosity above 160,000 centipoise at a room temperature of about 60° F. and a viscosity below 12,000 centipoise at a temperature above about 120° F., respectively.

Examples of suitable adhesives include a wide range of edible liquid syrups such as corn syrup, hydrocolloids such as gelatins, alginates and gums like xanthan gum, shortening, maltrodextrin, as well as various fats, starch and protein sources and/or carbohydrate polymers.

The adhesive can be applied to the score in a variety of forms, including as a concentrated liquid, an aqueous solution or as a dry powder, as well as applied dry and converted to a syrup with liquid). Adhesive solutions may contain from, e.g., 1%-90% adhesive, more particularly, from 5-50% adhesive.

Figure 3:
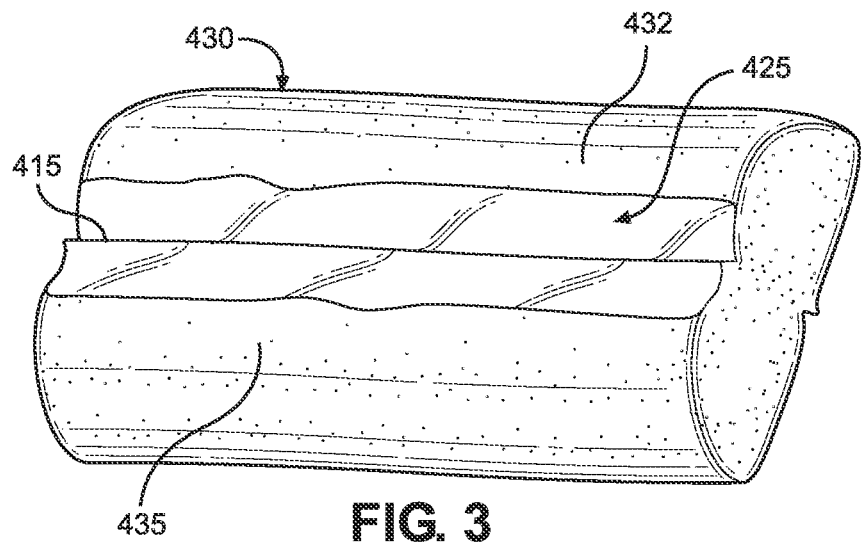
FIG. 3 is a perspective view of a dough piece formed using the production line and prior to freezing.

A dough piece 430 produced in accordance with the present invention with an adhesive applied upon a score region is shown in FIG. 3. In particular, dough piece 430 has opposing side surfaces 432 and 435 between which is formed score line 415. Applied along score line and extending into each of the opposing side surfaces 432 and 435, i.e., across a longitudinally extending central score region 450 so as to completely cover score line 415 while also extending into adjacent opposing side surfaces 432 and 435, is the adhesive. In general, the adhesive is preferably applied for the entire length of score line 415 and extends into each of the opposing side surfaces 432 and 435 to provide for the desired adhesion effect. Therefore, the extent to which the adhesive projects into the opposing side surfaces 432 and 435 can vary, particularly depending on the actual size of dough piece 430. Still, it is preferred that the adhesive be applied across at least 10%, preferably between 15-33%, of an upper surface of dough piece 430.

At this point, dough pieces 430 can be allowed to partially proof or proceed directly to freezing step 70, and then can be transported, while remaining in a frozen state, to a wholesale, retail or bakery establishment. In accordance with preferred embodiments of the invention, the frozen, scored and glued dough pieces 430 are thawed, proofed and baked (potentially thaw and proof at refrigerator temperature but dough pieces could go directly to an oven) similar to conventionally prepared frozen dough products, while avoiding the added step of manually scoring the partially proofed dough prior to baking. More specifically, the commercially produced frozen dough pieces are intended to be sold to bakers who bake and sell the resulting bread product. Most importantly, when thawing and then proofing, the adhesive will initially perform a gluing function to prevent the dough pieces from expanding along the score cuts prior to baking as such expansion would diminish or effectively negate the desired physical dimensions of the scores (note there is an approximately doubling of volume after one day at refrigeration temperature, while the volume can triple at ambient temperature and even quadruple in the oven). However, the adhesive is selected such that it will melt early in the baking cycle, prior to starch gelatinization, thereby enabling the dough to also expand along the released score cuts in the dough piece surface and resulting in the desired appearance of a traditionally scored baked bread. In a preferred embodiment of the invention wherein corn syrup is used as the adhesive, the viscosity of the corn syrup will decrease such that the corn syrup will no longer function as an adhesive as surface temperatures reach approximately 70-80° F. With other potential adhesives, the temperature can be higher, but always lower than the bake temperature, which is approximately 325° F. in accordance with a preferred embodiment. In connection with various embodiments tested, the adhesive has melted in accordance with the invention between 70° F. and 175° F. (many around 120° F.), i.e., the temperature wherein the viscosity of the adhesive drops upon warming wherein the coating no longer functions as an adhesive.

Figure 4:
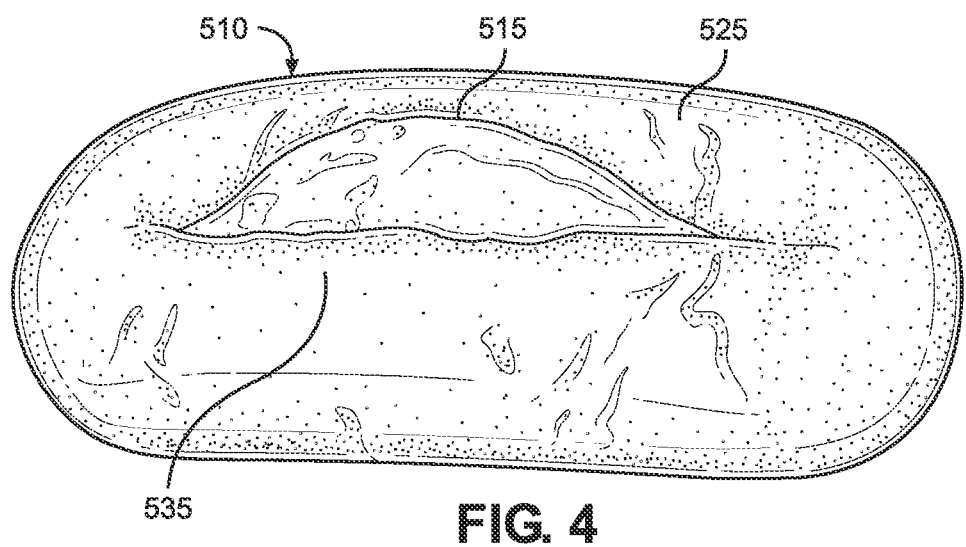
FIG. 4 is a cooked bread product produced in accordance with the present invention.

FIG. 4 depicts a final bread product produced in accordance with the present invention. Specifically, FIG. 4 shows a bread product 510, which corresponds to one of the adhesive coated dough pieces 430 after baking. Bread product 510 as a longitudinally opened or internal exposed region 515 between spaced, opposing longitudinally extending upper side surfaces 525 and 535. That is, in a central region of bread product 510, what was once a score 415 held together by the adhesive during the early stages of baking, opens to form an internal exposed region 515. That is, internal exposed region 515 occurs during baking of dough piece 430 as dough piece 430 expands, while the shape is, at least partially, controlled by the previously applied adhesive in longitudinally extending central region 450. As desired for such bread products, the bread in exposed region 515 is substantially lighter in color than the rest of the exterior of bread product 510. In particular, the bread in opening 525 is preferably much closer in color to the interior of bread product 510 than to the rest of the exterior of bread product 500. In the embodiment illustrated, dough product 500 is in the form of an Italian roll. However, it should be recognized that other bread products can certainly be produced in accordance with the present invention.

Based on the above, it should be readily apparent that the present invention provides scored dough pieces where the dimensions of the scores are preserved for a time within thawing and proofing steps prior to the cooking process based on the addition of an adhesive which can be applied before or after freezing and initially glues together upper side portions of the dough pieces until the adhesive melts after being exposed to heat during baking of the dough pieces to form the cooked bread products. While certain preferred embodiments of the present invention have been set forth, it should be understood that various changes or modifications could be made without departing from the spirit of the present invention. In general, the invention is only intended to be limited by the scope of the following claims.

The invention claimed is:

1. A method for producing a scored dough piece, the method comprising:
   forming a dough piece;
   scoring the dough piece, establishing one or more score regions;
   applying an adhesive to upper surface portions of the dough piece and across the scoring, with the adhesive being limited to the one or more score regions and with each score region including at least one score line and opposing surface portions of the dough piece directly adjacent the at least one score line; and freezing the dough piece to produce a frozen dough piece, wherein the adhesive is on the frozen dough piece.

2. The method of claim 1, wherein the adhesive is applied across approximately 15%-33% of the upper surface portions.

3. The method of claim 1, further comprising heating the dough piece to produce a bread product.

4. The method of claim 3, wherein the dough piece is heated through a baking operation.

5. The method of claim 4, wherein the adhesive melts during the baking operation, enabling the dough to expand along the scoring.

6. The method of claim 5, wherein the adhesive melts prior to starch gelatinization.

7. The method of claim 5, wherein the adhesive melts when the upper surface portions of the dough piece reach a temperature of approximately 70-80° F.

8. The method of claim 5, further comprising: thawing and proofing the dough, wherein the adhesive maintains an integrity and cut nature of the scoring as the dough thaws and proofs.

9. The method of claim 5, wherein the dough piece goes directly from a frozen state to an oven for baking.

10. The method of claim 1, wherein forming the dough piece includes:
transporting a plurality of spaced dough pieces with a conveyor system;
directing the plurality of spaced dough pieces through a scoring unit to establish a plurality of scored dough pieces; and
directing the plurality of scored dough pieces through an applicator to apply the adhesive.

11. The method of claim 1, wherein both scoring and the applying of the adhesive occurs before freezing of the dough piece.

12. The method of claim 1, wherein scoring occurs prior to freezing and the adhesive is applied after freezing of the dough piece.

13. The method of claim 1, wherein both scoring and the applying of the adhesive occurs after freezing of the dough piece.

14. A method of producing a bread product comprising:
forming a dough piece;
creating at least one score in the dough piece;
applying an adhesive to the dough piece, with the adhesive extending across the at least one score;
freezing the dough piece to produce a frozen dough piece; and
baking the dough piece, causing the adhesive to melt while establishing a bread product having, in a central region of the bread product, what was once a score held together by the adhesive during early stages of baking, an internal exposed region.

15. The method of claim 14, further comprising: thawing and proofing the dough piece, wherein the adhesive maintains an integrity and cut nature of the at least one score as the dough thaws and proofs.

16. The method of claim 14, wherein the adhesive is only applied in one or more score regions of the dough piece which extend across approximately 15%-33% of upper surface portions of the dough piece.

17. The method of claim 14, wherein the adhesive melts when upper surface portions of the dough piece reach a temperature greater than 70° F.

18. The method of claim 14, wherein the adhesive melts prior to starch gelatinization.

19. The method of claim 14, wherein both scoring and the applying of the adhesive occurs before freezing of the dough piece.

20. The method of claim 14, wherein scoring occurs prior to freezing and the adhesive is applied after freezing of the dough piece.

21. The method of claim 14, wherein both scoring and the applying of the adhesive occurs after freezing of the dough piece.

22. A frozen, ready-to-bake dough piece comprising:
at least one score line establishing one or more score regions of the dough piece, with each score region including at least one score line and opposing surface portions of the dough piece directly adjacent the at least one score line; and
an adhesive extending across only the one or more score regions to cover the at least one score line and into the opposing surface portions of the dough piece on either side of the at least one score line.

23. The frozen, ready-to-bake dough piece of claim 22, wherein the adhesive extends across approximately 15%-33% of the opposing surface portions.

24. The frozen, ready-to-bake dough piece of claim 22, wherein the adhesive has a melting temperature lower than a temperature for starch gelatinization of the dough piece.

25. The frozen, ready-to-bake dough piece of claim 22, wherein the dough piece constitutes bread.

* * * * *